Patented May 28, 1935

2,002,829

UNITED STATES PATENT OFFICE 2,002,829

MEDICINAL PREPARATION

Arnold E. Osterberg, Rochester, Minn., assignor to The Chemical Foundation, Incorporated, New York, N. Y., a corporation of Delaware No Drawing. Original application May 28, 1929, Serial No. 366,765. Divided and this application April 21, 1933, Serial No. 667,194

3 Claims. (Cl. 167—58)

This application is a division of my copending application Serial No. 366,765, filed May 28, 1929; upon which application Patent No. 1,908,176 was granted May 9, 1933, for Process for making a purified coal tar ointment.

The object of my invention is the production of a purified coal-tar ointment for the treatment of acute and subacute eczemas, and particularly infantile eczemas.

The use of crude coal tar in the treatment of eczematous inflammations of the skin, more particularly in cases of infantile eczema, has been found efficacious in affording prompt and striking relief, and has been widely adopted by specialists in dermatology. The use of crude coal tar in such cases has two notable objections: first, the tendency to cause folliculitis on the skin; and, second, its undesirable properties of stickiness and staining.

My invention or discovery consists in the identification and isolation of the therapeutically active principle present in the crude tar and in the separation of this active ingredient from the crude material and its extraction as a clean and efficient preparation free from the objectionable characteristics inherent in its use in the crude form.

As is well known, crude coal tar is a highly complex and variable mixture of many organic compounds. By the present process, I separate the crude coal tar into two fractions by distillation, as follows:

One liter of the crude coal tar is placed in a three-liter distilling flask and distilled by passing through the hot solution a rapid stream of steam until no more oil appears in the distillate. I discard the fraction consisting of black, viscous residual pitch and take the other fraction which is volatile with steam at about 100° C. at atmospheric pressure. This product I redistil in the presence of steam to insure the removal of any contaminating residual pitch which may have been carried over mechanically during the first distillation. The product is a volatile semi-solid ether-soluble oil which is next extracted with any immiscible organic solvent capable of dissolving ether-soluble substances, and preferably with ethyl-ether. The ether-soluble product resultant is then filtered through dry filter paper. The ether is removed by distillation and filtration, leaving a heterogeneous residue free from the residual tarry pitch, and containing various hydrocarbon and cresolic and phenolic substances. By fractionation with heat, or steam distillation from an alkaline solution, this residue may be further refined and purified, as these hydrocarbons and phenolic and like substances may be separated and extracted by suitable solvents, but for practical use, the ether-soluble product is sufficiently purified to be free from the objectionable features attendant the use of crude coal tar and without loss or diminution of its therapeutic properties when diluted in various strengths and mixed with substances commonly used in ointment preparations for cutaneous inflammations, such as zinc oxide, petrolatum and starch. As an example of such a composition, and that which I have found to be most efficacious for infantile eczema, I take, by weight:

Of the above-described

| | Parts |
|---|---|
| Ether-soluble tar distillate | 3 |
| Pulverized zinc oxide | 30 |
| Starch | 50 |
| Yellow petrolatum | 120 |

It is found important to mix the distillate thoroughly before adding to it the other ingredients and to incorporate it evenly with the ointment vehicle.

As the therapeutic principle which I have described is a fraction and not an entity, it is difficult to specify its constants with exactness. The product is a semi-solid, oily, yellow-colored, ether-soluble phenolic and hydrocarbon substance, volatile at a temperature lower than 200° C. and capable of distillation with steam at 100° C. at atmospheric pressure.

In the foregoing description where I have specified the primary distillation by passing through the hot solution of crude coal tar a rapid stream of steam until no more oil appears in the distillate, I wish it to be understood that such specification of the use of steam is of the method which I have practiced preferentially; but that such distillation may be effected by heat from any other source, as by dry distillation, the effective temperature being kept below 200° C., since this effective temperature will remove by volatilization the substances desired, with boiling points up to 200° C. I wish it also understood that where I have specified that the fraction obtained from such primary distillation is to be redistilled in the presence of steam, that such fraction, with boiling points up to 200° C., is redistilled in the presence of steam at a temperature of approximately 100° C. at atmospheric pressure.

Having thus described my invention, I claim:

1. A medicinal preparation, for the treatment of eczema, containing the ether-soluble fraction of the coal-tar distillate resultant at about but below 100° C., which fraction distils in the presence of steam at a temperature of approximately 100° C. at atmospheric pressure.

2. A medicinal preparation for the treatment of infantile eczema, containing the homogenous ether-soluble extract of the redistilled fraction of crude coal-tar which is steam-volatile at 100° C. at atmospheric pressure incorporated with an ointment vehicle containing pulverized zinc oxide and/or starch.

3. A medicinal preparation for the treatment of cutaneous inflammation of eczematous origin consisting of an ointment vehicle containing a minor percentage of the ether-soluble extract of the redistilled coal-tar distillate which is volatile at a temperature aproximating but below 200° C. and capable of distillation in the presence of steam at 100° C.

ARNOLD E. OSTERBERG.